(12) United States Patent
Denteneer

(10) Patent No.: US 8,953,466 B2
(45) Date of Patent: Feb. 10, 2015

(54) ENHANCED FORMATION OF MESH-TYPE NETWORKS

(75) Inventor: Theodorus Jacobus Johannes Denteneer, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 258 days.

(21) Appl. No.: 13/059,678

(22) PCT Filed: Aug. 19, 2009

(86) PCT No.: PCT/IB2009/053657
§ 371 (c)(1),
(2), (4) Date: Feb. 18, 2011

(87) PCT Pub. No.: WO2010/023601
PCT Pub. Date: Mar. 4, 2010

(65) Prior Publication Data
US 2011/0164525 A1    Jul. 7, 2011

(30) Foreign Application Priority Data
Aug. 25, 2008 (EP) .................... 08162869

(51) Int. Cl.
H04L 12/26 (2006.01)
H04W 40/24 (2009.01)
H04L 12/701 (2013.01)
H04W 40/16 (2009.01)

(52) U.S. Cl.
CPC ............ *H04W 40/246* (2013.01); *H04L 45/00* (2013.01); *H04W 40/16* (2013.01)
USPC ............................ 370/252; 370/311; 370/338

(58) Field of Classification Search
CPC ........................................... H04W 28/04
USPC .......... 370/252, 311; 455/432.3, 435.2, 63.1, 455/67.11
See application file for complete search history.

(56) References Cited

U.S. PATENT DOCUMENTS

| 2006/0014536 | A1 | 1/2006 | Demirhan et al. | |
|---|---|---|---|---|
| 2007/0147241 | A1* | 6/2007 | Wang et al. | 370/230 |
| 2008/0310342 | A1* | 12/2008 | Kruys et al. | 370/328 |
| 2009/0003291 | A1* | 1/2009 | Chu et al. | 370/338 |
| 2009/0268652 | A1* | 10/2009 | Kneckt et al. | 370/311 |

FOREIGN PATENT DOCUMENTS

CN    101015172 A    8/2007

OTHER PUBLICATIONS

Part 11: wireless LAN medium Access control (MAC) and Physical Layer (PHY) specifications, IEEE P802.11S Jan. 2008, IEEE P802.11 s™ 101.08.*

Bahr, M.: "Update on the Hybrid Wireless Mesh Protocol of IEEE 802.11s."; IEEE International Conference on Mobile Adhoc and Sensor Systems, 2007, pp. 1-6.

Fonseca et al: "Beacon Vector Routing: Scalable Point-to-Point Routing in Wireless Sensornets"; USENIX Association, NSDI 2005: 2nd Symposium on Networked Systems Design & Implemenation; pp. 329-342.

* cited by examiner

*Primary Examiner* — Un C Cho
*Assistant Examiner* — Romani Ohri (57) ABSTRACT

An enhanced formation of mesh type networks supports an initial mesh formation by advertising additional information which specifies at least one of an association with other mesh stations and a channel environment at a concerned mesh station.

9 Claims, 6 Drawing Sheets

ENHANCED FORMATION OF MESH-TYPE NETWORKS

FIELD OF THE INVENTION

The present invention generally relates to apparatuses, methods, computer program products and data structures for forming a mesh-type network, such as—but not restricted to—a mesh of a wireless local area network (WLAN).

BACKGROUND OF THE INVENTION

In WLAN deployments without mesh services, client stations or end stations (STAs) must associate with an access point (AP) in order to gain access to the network. These STAs are dependent on the AP with which they are associated to communicate.

A so-called mesh network appears functionally equivalent to a broadcast Ethernet from the perspective of other networks and higher layer protocols. As an example, the mesh network may be a LAN according to the IEEE (Institute of Electrical and Electronics Engineers) 802.11 specifications, where links and control elements forward frames among the network members. Thus, it normally appears as if all mesh points (MPs) in a mesh are directly connected at the link layer. This functionality is transparent to higher layer protocols.

A standard 'infrastructure' wireless Local Area Network is a centralised network in which STAs attach to the AP which acts as a 'master station'. This centralised topology makes network formation and initial channel selection easy. The AP is configured to start transmitting at a certain frequency channel and the STAs only need to find this channel e.g. by scanning a list of available frequencies. They can do so actively, by broadcasting probe requests on each visited channel, or passively, by listening for advertisements or beacons on each visited channel. After having visited all available channels, they will have found all APs that are in the vicinity, and can select one to associate with.

In a wireless mesh network, however, there is no central coordinating station. This makes network formation and initial channel selection more difficult than it is in a standard infrastructure network. In particular, problems exist in that a STA that performs active scanning might find a number of other stations on various frequency channels. In this case, it will need to choose and the current draft of the relevant standard prescribes a protocol based on channel precedence values for initial mesh formation (cf. Clause 11B.4 of the Draft Standard for Information Technology—Telecommunications and Information Exchange Between Systems—LAN/MAN Specific Requirements—Part 11: Wireless Medium Access Control (MAC) and physical layer (PHY) specifications: Amendment: Mesh Networking, IEEE Unapproved draft, IEEE P802.11s/D2.0, March 2008). According to this protocol, each mesh node selects a channel precedence value. Next, it carries out some active and passive scanning. Then, if no suitable neighbors are found, it selects a channel and advertises its channel precedence value. If it finds multiple neighbours, it selects one of these based on the numerically highest channel precedence value. However, this protocol is flawed in two ways.

As a first problem, often disjoint meshes are formed during mesh formation in a number of important scenarios.

Figure 2A:
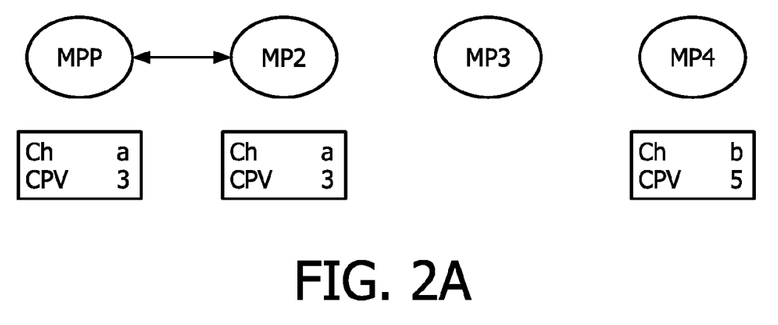
FIGS. 2A and 2B show a schematic mesh-type environment prior to and after formation of disjoint meshes as a result of a conventional selection mechanism.

FIG. 2A shows a schematic mesh-type environment with four exemplary mesh nodes MPP and MP2 to MP4 during start up. One of the mesh nodes is a mesh point portal MPP which has a peer link with a second mesh node MP2 on a channel "a" and with a channel precedence value (CPV) of "3". A fourth mesh node MP4 is out of range with the second mesh node MP2 and has stopped the active scanning process and has adopted one of its mesh profiles, a channel "b", and a CPV of "5". The CPV of the fourth mesh node MP4 is selected at random and happens to be higher than the CPV advertised by the second mesh node MP2.

Figure 2B:
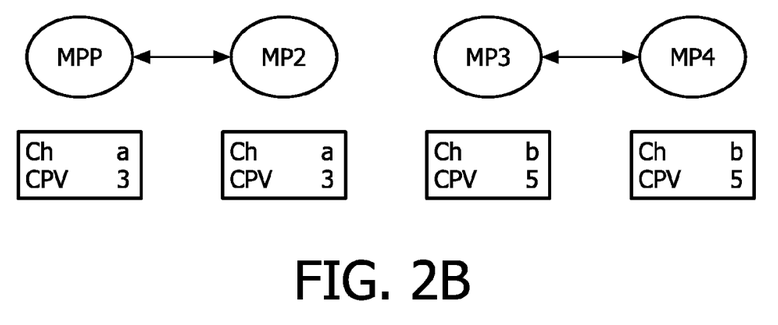

FIG. 2B shows the schematic mesh-type environment of FIG. 2A after a disjoint mesh has been formed due to the fact that a third node MP3 has used the above CPV-based protocol selection mechanism to select a candidate peer node. According to the above selection mechanism, the third node MP3 shall select the fourth MP4 with the higher CPV of "5" as the candidate to establish a peer link with, so that two disjoint meshes have been formed, rather than one connected mesh.

As a second problem, the purpose of multi-radio devices is completely disregarded.

Figure 3:
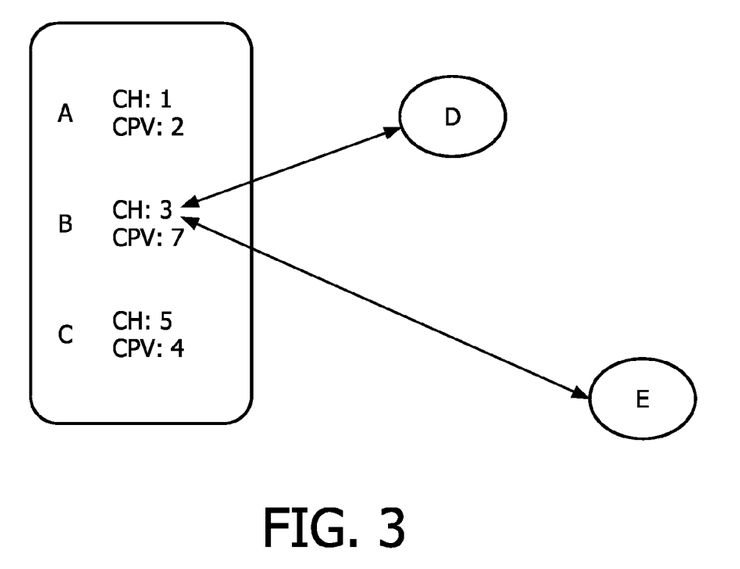
FIG. 3 shows a mesh-type environment with a multi-radio device.

FIG. 3 shows a mesh-type environment with a multi-radio device comprising first to third radio devices A to C and two mesh nodes D, E. Assuming that the two mesh nodes D, E select candidate peers on the basis of the CPV, the purpose of multi-radio devices is not considered. In the situation show in FIG. 3, the radio devices A to C have stopped scanning, have selected channels "1", "3" and "5", respectively, and advertise respective CPVs of "2", "7" and "4" for their chosen channels. Any new device or node in the environment that starts up will find the three radios A to C. However, because of the conventional selection mechanism of the above protocol, it has to select the radio that advertises the highest CPV. In FIG. 3, this is the second radio device B, as it advertises a CPV of "7", whereas the first radio device A advertises a CPV of "2", and the third radio device C advertises a CPV of "4". Consequently, the first and third radio devices A, C will be completely ignored during mesh formation and will not establish peer links. I.e., when the two mesh nodes D, E start up, they both will select the second radio device B as candidate peer and ignore the other radio devices A, C.

SUMMARY OF THE INVENTION

It is an object of the present invention to provide a more flexible initial network formation approach.

This object is achieved, at a transmitting end of an advertisement, and at a receiving or overhearing end of an advertisement, by an apparatus and a method.

Accordingly, by providing an indication specifying at least one of a connection status or a channel interference in network advertisements or beacons, formation of disjoint networks and inefficient use of radio sources in multi-radio devices can be prevented. Additionally, the proposed enhanced channel selection can be achieved at low overhead, as, currently in the above draft 802.11s amendment, there are still unused bits in the flag fields of mesh headers. Additionally, it should be considered that the CPV (e.g. 4 octets) need not be used during mesh formation and, therefore, can be dispensed with.

The proposed apparatuses may be implemented as processor devices, modules, chips, chip sets or circuitries provided in a network node or station. A processor may be controlled by a computer program product comprising code means for performing the steps of the claimed methods when run on a computer or processor device.

According to a first aspect, the indication may be set in a header of the propagated message. More specifically, as an example, the indication may be set in a respective flag field of the header. The addition of the indication in the header provides the advantage that reserved fields in conventional headers may be used for conveying the indication, so that no additional signaling overhead is generated.

According to a second aspect which can be combined with the above first aspect, the connection status may indicate a connection to a portal of the mesh type network. Thereby, it can be ensured that mesh formation will always start from a portal of the mesh type network.

According to a third aspect which can be combined with any one or both of the above first and second aspects, the channel interference characteristic may indicate an interference environment of a concerned channel. This provides the advantage that a mesh node can use this information to estimate a channel occupancy time or other interference related parameters. In a specific example, the channel interference characteristic may be determined in a simple manner by counting the number of active stations detected on a concerned channel, or the number of peer mesh points with which it has already established peer link relations.

Further advantageous developments are defined in the dependent claims.

BRIEF DESCRIPTION OF THE DRAWINGS

The present invention will now be described based on various embodiments with reference to the accompanying drawings in which.

DETAILED DESCRIPTION OF EMBODIMENTS

Figure 1:
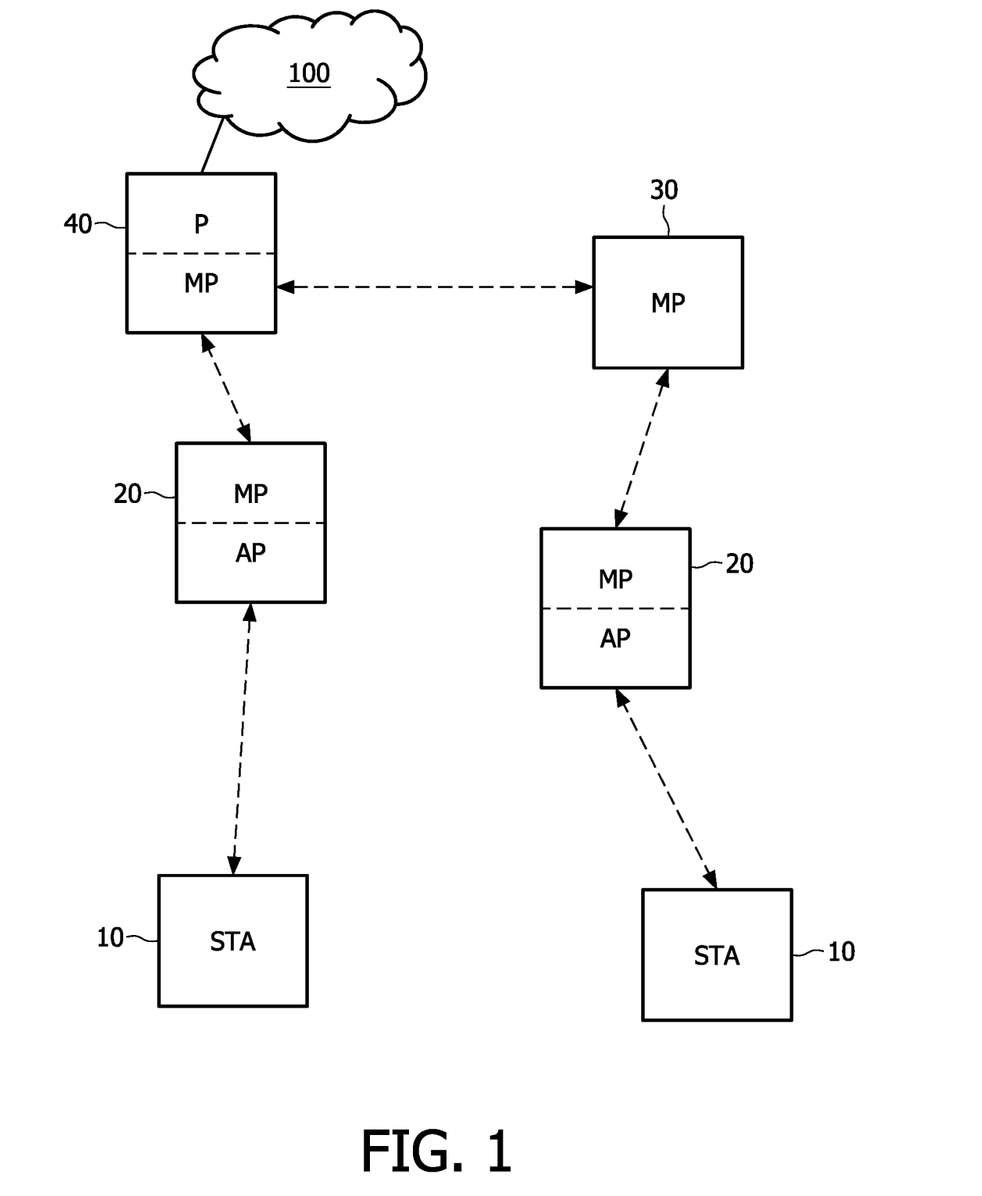
FIG. 1 shows a schematic network topology of several wireless nodes in a mesh network.

In the following, embodiments of the present invention are described on the basis of an exemplary wireless mesh network topology as shown in FIG. 1.

End-user devices (such as end stations (STAs)) 10 can benefit from the ability to establish interoperable peer-to-peer wireless links with neighboring end-user devices and APs in a mesh network. Mesh points (MPs) 30 can be quality of service (QoS) STAs that support mesh services, i.e. they participate in interoperable formation and operation of the mesh network. An MP may be collocated with one or more other entities (e.g., AP, portal, etc.). The configuration of an MP that is collocated with an AP is referred to as a mesh access point (MAP) 20. Such a configuration allows a single entity to logically provide both mesh functionalities and AP functionalities simultaneously. STAs associate with APs to gain access to the network. The configuration of an MP that is collocated with a portal (P) is referred to as a mesh point portal 40 (MPP). MPs participate in mesh functionalities such as path selection and forwarding, etc. The mesh point portal 40 provides an interface to other networks 100, e.g., to other IEEE 802 LAN segments or other type of networks.

According to a first embodiment, a new information or indication is conveyed in or added to a mesh flag field of a mesh header used in advertisements or beacons. According to a first embodiment, a bit in the mesh flags field of the mesh header is set to indicate whether the station has a connection to a portal, or vice versa.

This new information can then be automatically advertised during mesh formation via beacons, advertisements and/or probe response frames. As there may be unused bits in the available flag fields, no extra overhead may be required.

Figure 4:
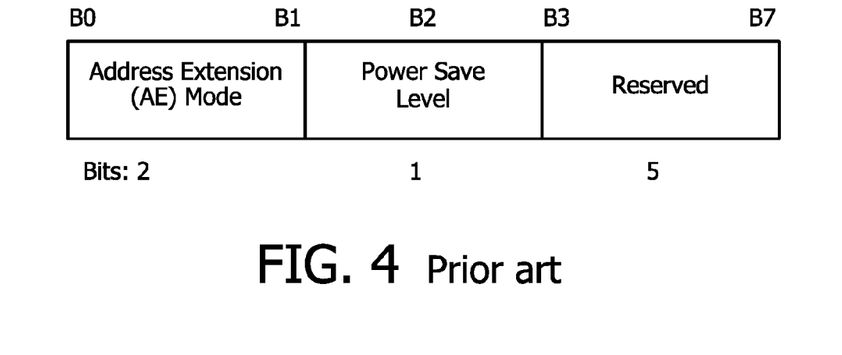
FIG. 4 shows conventional flag fields of a mesh header.

FIG. 4 shows a conventional flag field of a mesh header. In this conventional example, the mesh flag field comprises 8 bits in length and the flags therein are used to control mesh-specific header processing, e.g., for mesh address extension. The first two bits B0, B1 are used for signaling an address extension (AE) mode, the third bit B2 is used for signaling a power save level, and the fourth to eights bits B3-B7 are reserved.

Figure 5:
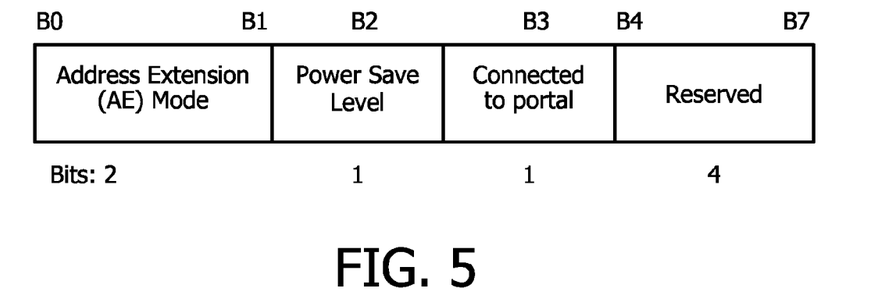
FIG. 5 shows flag fields of a mesh header according to a first embodiment.

FIG. 5 shows a flag field of a mesh header according to the first embodiment. It is proposed to introduce at least one bit in the mesh flag field of the mesh header field. This at least one new bit can be used or reserved as an indicator which indicates or signals a connection status (e.g. "Connected to portal") of the advertising radio device or mesh node. This connection status indicator field can be for example a one bit field (cf. fourth bit B3 in FIG. 5) which is set to "0" if the MP is not currently connected to a portal and which is set to "1" if the MP is connected to a portal.

According to a second embodiment which may be combined with the first embodiment, a value in the mesh flag field is modified or set to indicate a channel characterization information, such as an interference environment of a channel which a concerned radio device or mesh node uses.

Figure 6:
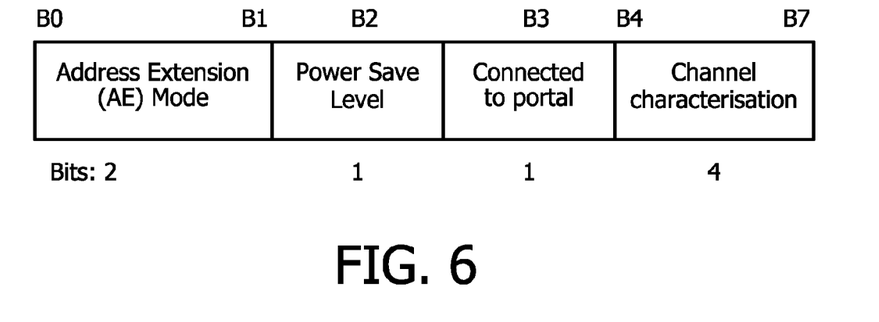
FIG. 6 shows flag fields of a mesh header according to a second embodiment.

FIG. 6 shows a flag field of a mesh header according to the second embodiment. As an enhancement of the conventional mesh header, at least one bit that is not currently used in the conventional mesh flag field can be used for channel characterization. This can be done in a number of ways. Thus, a mesh node can make an estimate of the channel occupancy time, or channel busy fraction, i.e. the amount of time during which the channel is occupied. To measure the channel busy fraction, the mesh point could use the clear channel assessment (CCA) procedure that is available in current wireless transmit and receive units and that is used to detect whether a channel is occupied or empty. A possible CCA procedure is described for example in Clause 12.3.5.10 of the IEEE standard 802.11 Rev 2007. The channel busy fraction then reports the fraction of time during which the channel was occupied. As an alternative, it can report the number of stations (both mesh and legacy) with which it shares the channel, or the number of mesh points with which it has already established a peer relationship, i.e. with which it has a mesh link. In the example of FIG. 6, which also comprises the connection status indication bit B3, the remaining three reserved bits B4-B7 of the conventional flag field of FIG. 4 are used to convey, signal or indicate the channel characterization information.

Multi-radio devices carry out the same procedure. Here, multiple radios in one device automatically have peer links established among themselves. Hence, as soon as one of the radios in a device sets the connection status bit to "1", the other radios in the devices follow.

The connection status indicator according to the first embodiment makes available an information that a concerned mesh node has an established connection to a portal, and thus to other networks and the Internet. This node is therefore not likely to switch channels again quickly.

In the enhancement according to the second embodiment, STAs that dwell on one channel, to perform mesh initialization and beaconing characterize the medium, e.g. by counting the number of active STAs that they see on this channel or by determining the channel busy fraction. They can now report this figure in the above channel characterization field shown in FIG. 6. Depending on the exact nature of this figure, some appropriate coding can be chosen, e.g. if the number of stations is counted, then a value "15" may indicate 15 or more other stations on the channel. The node may update this field during operation dependent on the activity on the channel.

In general, at least two types of mesh networks can be distinguished, i.e. "infrastructure" mesh networks and "ad hoc" mesh networks. Infrastructure mesh networks are designed to provide a replacement for a wired infrastructure. They may form some wireless backbone to a portal which connects to a wire. Ad hoc mesh networks, by contrast, provide spontaneous peer-to-peer connectivity between nodes, without the need for infrastructure being present.

Figure 7:
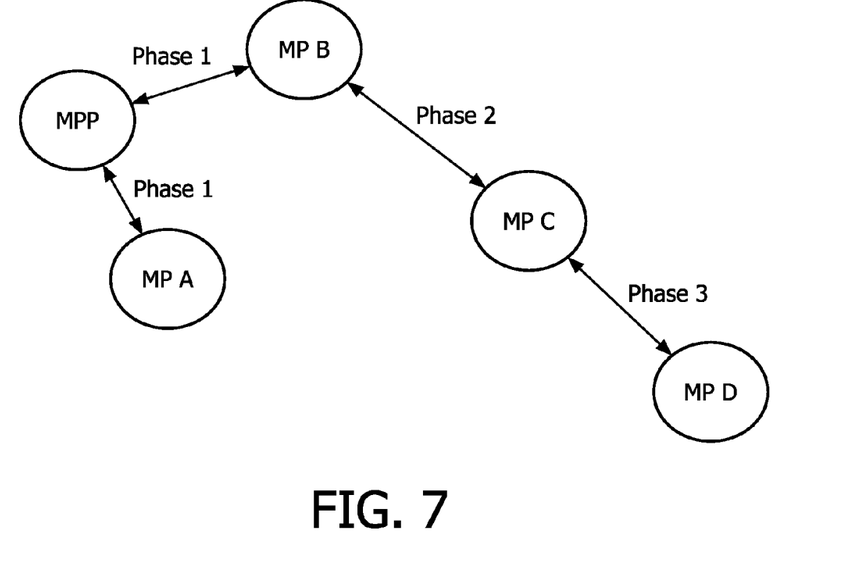
FIG. 7 shows formation phases of an infrastructure type mesh according to the embodiments.

FIG. 7 shows formation phases of an infrastructure type mesh network according to various embodiments and based on some simple rules on manipulation of the proposed added header information. A mesh node MPP collocated with a portal sets on start up the connection status flag or bit to "1". A mesh node MP A, not collocated with a portal sets on start up the connection status flag or bit to "0". Once one or more peer links have been established by a mesh point, the respective mesh point sets its connection status bit to the maximum value of its own connection status bit and the connection status bit of its peer as observed in advertisements, beacons or probe responses.

In the infrastructure type mesh environment of FIG. 7, the mesh can be formed in a number of phases starting at the mesh node collocated with the portal MPP, as already indicated above. Such infrastructure mesh networks should grow from the portal MPP. I.e. the mesh node MPP collocated with the portal MPP starts the mesh, mesh nodes in communication range, i.e. MP A and MP B, associate with this portal mesh node MPP, and so the mesh develops from the MPP. It then evolves successively in phases 2 and 3, as depicted in FIG. 7, when MPs further away from the MPP associate with the mesh. The provision of the proposed enhanced advertisement information supports this behavior. In fact, this behavior no longer depends on chance timing events, so that it can be ensured that this wanted behavior is exhibited in larger mesh networks.

Figure 8:
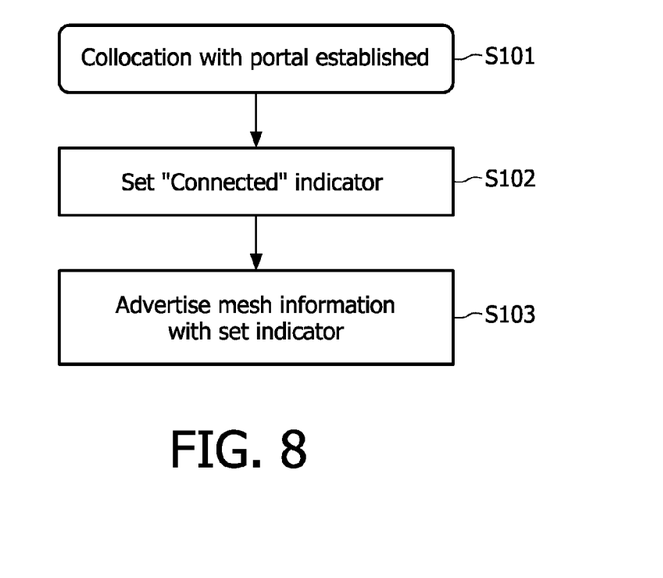
FIG. 8 shows a flow diagram of an indication setting procedure according to a third embodiment.

FIG. 8 shows a schematic flow diagram of an enhanced advertisement mechanism or procedure in a mesh network, according to a third embodiment.

The procedure is initiated as soon as a mesh node or radio device detects that a connection to a portal is established (step S101). In response thereto, the connection status indicator of flag "Connected" is set (step S102). Finally, an advertisement, beacon or probe response with the set connection status indicator is advertised (step S103) trough the mesh network.

Figure 9:
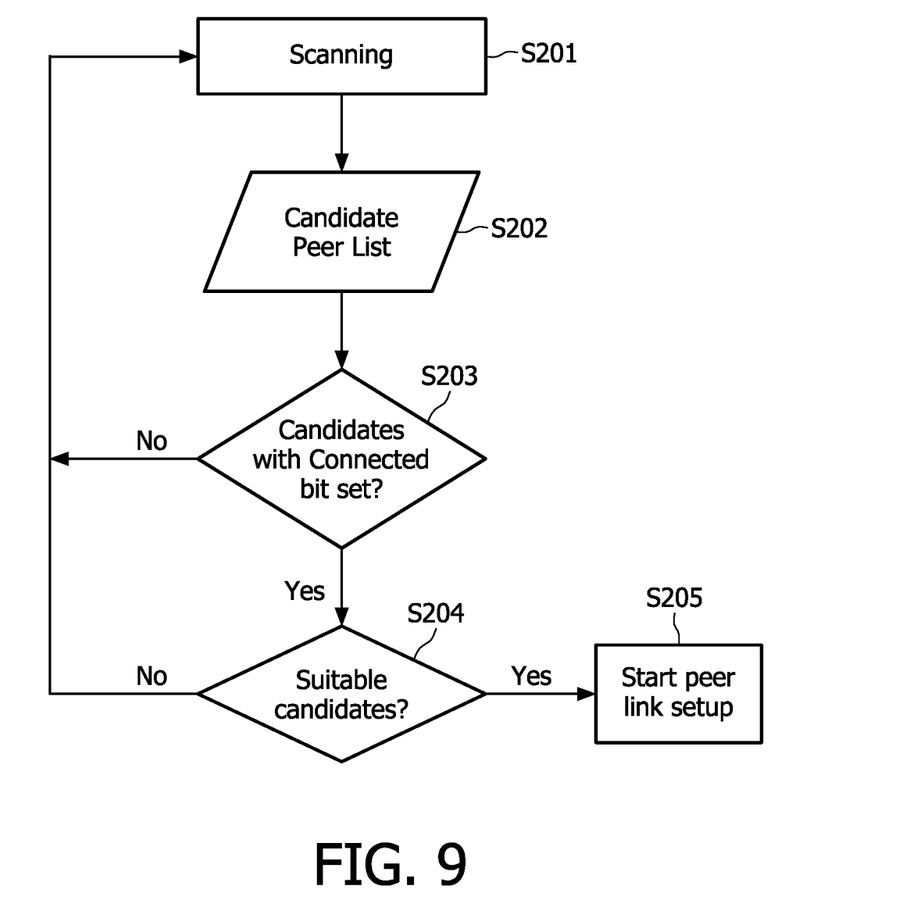
FIG. 9 shows a flow diagram of scanning procedure according to a fourth embodiment.

FIG. 9 shows a flow diagram of scanning procedure according to a fourth embodiment. This procedure may be for example a typical scanning behavior of an infrastructure type node in an ad hoc network.

With the proposed flag field according to the first and/or second embodiment, the desired scanning behavior can be easily enforced and leads to a simple scanning procedure. As indicated in connection with FIG. 8, a mesh node or radio device collocated with a portal starts advertising or beaconing with a connected status flag or bit set to "1". In step S201, other mesh nodes scan their environment. In step S202, a detected candidate peer is added to a candidate peer list. In step S203, the candidate peer list checked for a candidate with a set connection status information and the scanning and listing steps are repeated until candidates with portal connection have been found. Then, in step S204 it is checked for suitable candidates, e.g., based on at least one of their location, signal characteristic, channel characteristic, CPV, etc. If no suitable candidate is found in step S204, the procedure jumps back to step S201 and continues scanning. Otherwise, if a suitable candidate has been found, a peer link setup is started in step S205.

Each node itself advertises a connection status bit set to "0" whenever it needs to report an advertisement, beacon or probe response. Once it has found a neighboring mesh node with a connection to a portal, it initiates a peer link setup algorithm with this node, subject to the standard rules that hold for peer link setup. As soon as it has setup a link, it sets the bit in its own flag field to become available as a partner to set up peer links. The initialization of the mesh network can then evolve as intended.

Figure 10:
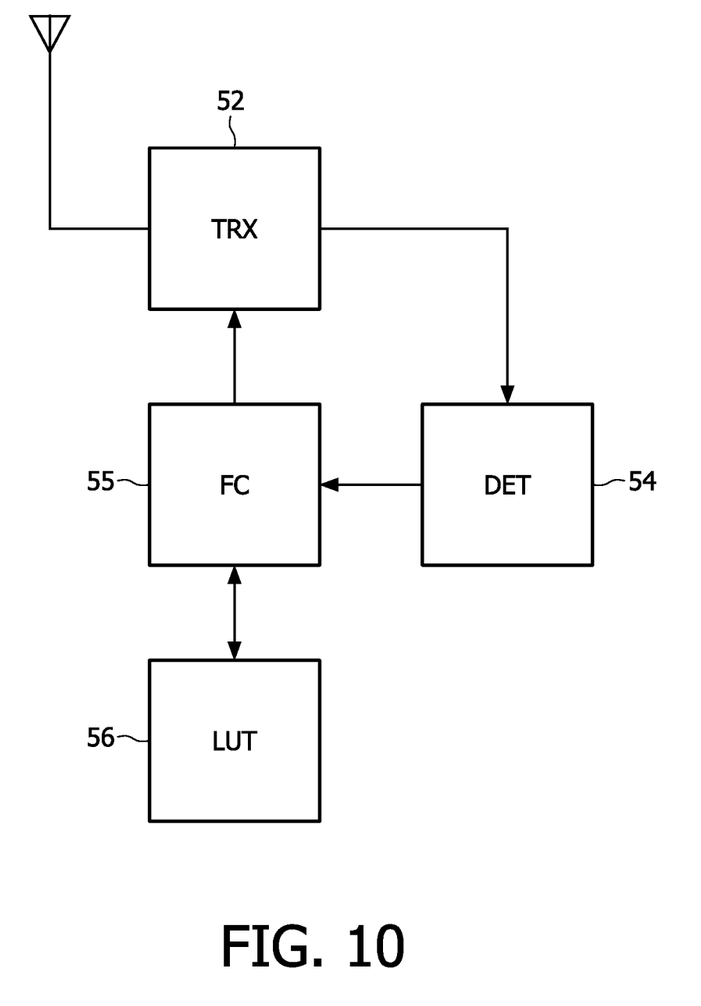
FIG. 10 shows a schematic block diagram of a mesh node according to a fifth embodiment.

FIG. 10 shows a schematic block diagram of a mesh node according to a fifth embodiment, which can be a mesh point, a mesh access point, a mesh portal, or any other type of radio node or device. It can be implemented as a discrete hardware circuit or circuitry, a chip, a chip set, a module or a software-controlled processor or computer device where the functions of FIG. 5 are provided as software programs or routines.

Advertisements, beacons, probe responses or the like can be received and transmitted by a transceiver (TRX) circuit 52 which may be provided in a radio frequency (RF) front end of the radio node. Signals which are generated in the mesh node are supplied to the TRX 52 via a formation control unit (FC) 55 which adds or sets at least one of the connection status information and the channel characterization information to a new beacon, advertisement, probe response or the like, based on a control information obtained from a detection unit 54. The detection unit 54 detects, e.g., based on exchanged signaling, whether a connection to a portal has been setup. Furthermore, the detection unit 54 detects channel characteristics as defined in the above second embodiment.

Additionally, the detection unit 54 checks for at least one of the connection status information and channel characterization information in a received signal and provides a corresponding indication to the formation control unit 55. Based on this indication, a candidate peer list can be stored e.g. by the formation control unit 55 in a look-up table (LUT) 56 which may be provided in a memory or register or the like, e.g., as a programmable non-volatile storage. Then, based on the candidate peer list, the formation control unit 55 may initiate a peer link setup or the like.

Thus, the functionalities of the formation control unit 55 of FIG. 10 enable implementation of either one or both of the procedures described in connection with FIGS. 8 and 9.

The proposed embodiments also support better operations when using multi-radio devices. In case one radio device in a multi-radio devices interconnects, maybe via a chain of nodes, to a portal, all radio devices in the multi-radio device set the connection status information. The radio device that connects to the portal has its link on a given channel, which can be optionally characterized by means of the chosen metric in the channel characterization field. The other radio devices can carry out some scanning procedure or also fix a channel for operation. Should the latter option be chosen, the radio device can then also carry out a characterization of the environment. New radio devices entering the environment can now choose appropriately to establish a link with one of the radio devices in the multi-radio device and are not forced to a random, inappropriate, choice.

In summary, an enhanced formation of mesh type networks has been described, wherein an initial mesh formation is supported by advertising additional information which specifies at least one of an association with other mesh stations or a channel environment at a concerned mesh station.

It is noted that the present invention is not restricted to the above embodiments and can be used for any network environment which allows advertisement of status information. It is apparent to a person skilled in the art that the other fields or bit numbers may be used to convey or signal the proposed additional information. Moreover, the designation of the additional information may be different. As an alternative to the above embodiments, a bit pattern which is already used may be modified in a predetermined manner or predetermined bit positions may be set in accordance with predetermined rules. As a further alternative, predetermined values may be assigned or allocated to each re-beacon, advertisement, probe response or the like to signal the desired additional information which supports mesh formation.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill the functions of several items recited in the claims. The mere fact that certain measures are recited in mutually different dependent claims does not indicate that a combination of these measures cannot be used to advantage. A computer program used for controlling processor to perform the claimed features may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. An apparatus for controlling formation of a mesh type network by establishing interoperable peer to peer wireless links between neighboring wireless end stations (STAs) and access points (APs) configured to provide access to the mesh type network, the apparatus comprising:
a detector configured to detect at a source STA information about at least one of a connection status and a channel interference characteristic in a header of a propagated message received from said mesh type network; and
a controller configured to
obtain an indication corresponding to the detected information,
store a candidate peer list based on the obtained indication, and
select a candidate for a peer link setup based on the candidate peer list.

2. The system of claim 1, wherein said indication is set as a flag field in said header.

3. The system of claim 1, wherein said connection status indicates a connection to at least one mesh point portal MPP of said mesh type network.

4. The system of claim 1, wherein said channel interference characteristic indicates an interference environment of a channel.

5. The system of claim 1, wherein said channel interference characteristic is determined by counting the number of active STAs detected on a channel, or by counting the number of mesh points (MPs) with which it has already established a peer relationship or by determining a channel busy fraction.

6. A method of forming a mesh type network by establishing interoperable peer to peer wireless links between neighboring wireless end stations (STA) and access points (APs) configured to provide access to the mesh type network, the method comprising the acts of:
detecting at a source STA information about at least one of a connection status and a channel interference characteristic in a header of a propagated message received from said mesh type network;
storing a candidate peer list based on the obtained indication, and
selecting a candidate for a peer link setup based on the candidate peer list.

7. The method of claim 6, further comprising the act of selecting a candidate for peer link setup based on at least one of the status and the channel interference characteristic propagated through said mesh type network.

8. A system for advertising a status of a peer-to-peer wireless connection in a mesh type network, said system comprising:
a plurality of access points (APs) configured to provide access to the mesh type network;
a plurality of mesh points (MPs), each participating in interoperable formation and operation of the mesh type network by connecting to others of the plurality of MPs;
at least one mesh point portal (MPP) configured to provide an interface to external networks and formed by co-locating of the plurality of MPs with a portal to one of the external networks;
at least one a mesh access point (MAP) configured to simultaneously provide mesh and AP functionalities and formed by co-locating one of the plurality of MPs with one of the plurality of APs;
a plurality of wireless end stations (STAs) configured to establish peer-to-peer wireless connection with neighboring STAs and APs, wherein each STA comprises a circuit configured to
detect a propagated message having a header;
set in the header one or more flags indicating a status of the peer-to-peer wireless connection and a channel interference characteristic of the STA, and
propagate the message with the set indication in the mesh network; and
an apparatus for controlling formation of a mesh type network, wherein the apparatus is configured to
detect a at a source STA information about at least one of a connection status and a channel interference characteristic in the a header of a propagated message received from said mesh type network,
obtain an indication corresponding to the detected information,
store a candidate peer list based on the obtained indication, and
select a candidate for a peer link setup based on the candidate peer list.

9. The method of claim 5, wherein MPs are selected from quality of service STAs.

* * * * *